United States Patent [19]

Miller

[11] Patent Number: 5,570,608
[45] Date of Patent: Nov. 5, 1996

[54] POWER TRANSMISSION

[76] Inventor: Robert H. Miller, 600 Laurel Way, Casselberry, Fla. 32707

[21] Appl. No.: 384,648

[22] Filed: Feb. 6, 1995

[51] Int. Cl.$^6$ ................................................ F16H 3/08
[52] U.S. Cl. ................... 74/325; 74/372; 192/71; 192/93 C
[58] Field of Search ................... 74/371, 372, 325; 192/71, 93 C

[56] References Cited

U.S. PATENT DOCUMENTS

| | | |
|---|---|---|
| 1,513,694 | 10/1924 | Cunningham . |
| 1,717,632 | 6/1929 | Spangler . |
| 1,735,187 | 11/1929 | Storle . |
| 1,778,604 | 10/1930 | Peterson ................................. 74/371 X |
| 1,913,949 | 6/1933 | Peterson ................................... 74/371 |
| 2,117,654 | 5/1938 | Cotanch ................................... 74/375 |
| 2,243,548 | 5/1941 | Wolkoff ....................................... 192/4 |
| 2,376,799 | 5/1945 | Miller ..................................... 192/93 C |
| 2,506,713 | 5/1950 | Fast ........................................ 192/93 C |
| 2,861,461 | 11/1958 | Kreidler ..................................... 74/371 |
| 3,691,861 | 9/1972 | Sturmer ..................................... 74/330 |
| 3,707,884 | 1/1973 | Go ............................................. 74/372 |
| 4,398,432 | 8/1983 | Quick ........................................ 74/331 |
| 4,464,947 | 8/1984 | Windsor-Smith ........................ 74/329 |
| 4,565,106 | 1/1986 | Sumiyoshi ................................ 74/359 |
| 4,597,304 | 7/1986 | Cataldo ..................................... 74/329 |
| 4,640,145 | 2/1987 | Vandervoort ............................. 74/325 |
| 5,279,402 | 1/1994 | Beigang ............................. 192/93 CX |

FOREIGN PATENT DOCUMENTS 0584135  12/1977  U.S.S.R. ............................. 192/93 C

Primary Examiner—Charles A. Marmor
Assistant Examiner—Saul Rodriguez
Attorney, Agent, or Firm—William M. Hobby, III

[57] ABSTRACT

A multiple speed power transmission for coupling to an engine includes a gear box or housing having an input and an output shaft, each rotatably mounted in the housing and extending therefrom. A clutch is coupled to releasably engage the input shaft to thereby couple the input shaft to an engine or the like. A plurality of first gears freely rotate on the input shaft while a plurality of second gears are mounted to the output shaft to rotate with the output shaft. Each of the second gears are intermeshed to constantly couple to one of the first gears. The input shaft has a bore extending thereinto from one end thereof and has a plurality of side openings into the center bore. A plurality of first gear engaging members are located between the input shaft in each of the first gear members for selectively engaging each first gear to the input shaft such that only one first gear is engaged to the input shaft at a time. An elongated gear changing bar is movably mounted in the input shaft bore and has engaging portions thereon which can be aligned through the input shaft openings for engaging one of the plurality of first gear engaging members to the input shaft when the elongated gear changing bar is positioned in a predetermined position to thereby couple the input shaft through one first gear to one second gear to thereby couple the input and output shafts. Coupling can be accomplished through spherical wedging members, such as ball bearings, placed in the input shaft side openings, and in which each opening is an angled or arced opening to allow wedging of the wedging members between the input shaft and the first gear. The elongated gear changing bar can be either slid axially within the input shaft bore or rotated within the input shaft bore to align raised or camming surfaces with the input shaft openings to selectively lift the spherical wedging members.

7 Claims, 2 Drawing Sheets

# POWER TRANSMISSION

BACKGROUND OF THE INVENTION

The present invention relates to a multi-speed power transmission and especially to a multiple gear transmission having constantly meshed gears.

In a typical road vehicle, power is conveyed from an engine to the rear or front wheels by a transmission system. The transmission system includes a fluid or dry plate clutch, a transmission housing or gear box, and a final drive system. Clutches typically are formed of multiple plates which can be moved in and out of surface contact with each other to thereby engage or disengage the input shaft to the transmission from a power source, such as a vehicle engine. In a typical manual transmission, means have been employed for moving predetermined gears of the driving mechanism in and out of engagement for in and out of alignment with their intermeshing gears for the purpose of obtaining forward and reverse drives. It has also been known in the past to utilize constant mesh transmissions in which pairs of gears are in constant meshing engagement and are selectively rendered operative by coupling selective gears with a shaft of the transmission to which other gears are secured. A typical constant mesh transmission will utilize a plurality of clutches placed to engage one clutch from one pair of gears while disengaging the other clutches for each of the other pairs of meshed gears so that only one constantly engaged gear between the input and output shaft is connected to the power through the input shaft by a clutching member for that gear.

The present invention has for one of its objects a constant intermeshed gear transmission which simplifies the changing of gears so that only one gear of predetermined ratio is powering the output shaft at any one time and which drive gear can be shifted to a second drive gear without the benefit of plural actuated clutches.

Typical prior art constant mesh transmissions can be seen in U.S. Pat. No. 2,117,654 to Cotanch for a Power Transmission Mechanism of the variable speed type having multiple forward speeds and a reverse drive and which employs gears constantly intermeshed in all of the driving mechanisms and in U.S. Pat. No. 4,640,145 to Vandervoort for a Multiple Countershaft Transmission which has an improved multiple substantially identical countershaft assembly change gear transmission having two countershafts. In the Sturmer patent, U.S. Pat. No. 3,691,861, a basic multi-stage constant mesh transmission mechanism is provided which can be used with an automatic transmission as well as a manual transmission in which the input unit has two input shafts and a main clutch for connecting the gears selectively to a drive shaft. In the Cunningham patent, U.S. Pat. No. 1,513,694, a transmission is provided which allows a change speed gearing for motor vehicles in which the speed change gearing utilizes constantly meshing gears. In the Wolkoff patent, U.S. Pat. No. 2,243,548, a power transmission is provided in which the different speed gears are always in mesh and power is transmitted from the input shaft to the output shaft by means of selected clutches and in which a braking mechanism controls the clutch operating mechanism. In the Quick patent, U.S. Pat. No. 4,398,432, a vehicle transmission has a power shifting and overrunning clutch to selectively provide a multiple speed transmission to provide shifting on the go. In the Storle patent, U.S. Pat. No. 1,735,187, a transmission for motor driven vehicles provides for shifting the driving connection between two shafts from one shaft of gears of different ratio. The Spangler patent, U.S. Pat. No. 1,717,632, is a speed changing transmission in which the gears are not shifted but rather the clutch mechanisms for the various speeds and for the reverse gear are operated by the driver according to the manner in which he wishes to operate the vehicle. In the Cataldo patent, U.S. Pat. No. 4,597,304, a multi-speed power transmission has an input shaft and a coaxially aligned output shaft and each shaft has gearing members connected to it. Selectively engagable clutch mechanisms are used to selectively connect respective ratio gear shafts to change the gear ratio. The Windsor-Smith et al. patent, U.S. Pat. No. 4,464,947, is an automatic transmission for city buses and the like which uses a constant mesh multiple layshaft type gear train. The Sumiyoshi patent, U.S. Pat. No. 4,565,106, is a gear transmission mechanism for automotive vehicles, such as passenger cars, in which each of one of a pair of gears is a fixed gear which is fixed to a shaft on which it is mounted and the other gear is an idler gear which is selectively operated by a gear engaging system to rotationally couple the idler gear to the shaft on which it is mounted to thereby engage the gear.

The present invention is directed towards a constantly meshed gear transmission in which a plurality of driver ratios are accomplished through a plurality of different size gears, one of each pair of gears being fixedly attached to an output shaft while each of the gears connected to the input shaft acts as an idler gear until that gear is engaged to thereby operate the transmission at that gear ratio and which transmission allows for the smooth shift from one idler gear to another to engage each gear sequentially to change the gear ratio of the transmission.

SUMMARY OF THE INVENTION

A multiple speed power transmission for coupling to an engine includes a gear box or housing having an input and an output shaft, each rotatably mounted in the housing and extending therefrom. A clutch is coupled to releasably engage the input shaft to thereby couple the input shaft to an engine or the like. A plurality of first gears freely rotate on the input shaft while a plurality of second gears are mounted to the output shaft to rotate with the output shaft. Each of the second gears are intermeshed to constantly couple to one of the first gears. The input shaft has a bore extending thereinto from one end thereof and has a plurality of side openings into the center bore. A plurality of first gear engaging members are located between the input shaft in each of the first gear members for selectively engaging each first gear to the input shaft such that only one first gear is engaged to the input shaft at a time. An elongated gear changing bar is movably mounted in the input shaft bore and has engaging portions thereon which can be aligned through the input shaft openings for engaging one of the plurality of first gear engaging members to the input shaft when the elongated gear changing bar is positioned in a predetermined position to thereby couple the input shaft through one first gear to one second gear to thereby couple the input and output shafts. Coupling can be accomplished through spherical wedging members, such as ball bearings, placed in the input shaft side openings, and in which each opening is an angled or arced opening to allow wedging of the wedging members between the input shaft and the first gear. The elongated gear changing bar can be either slid axially within the input shaft bore or rotated within the input shaft bore to align raised or camming surfaces with the input shaft openings to selectively lift the spherical wedging members.

BRIEF DESCRIPTION OF THE DRAWINGS

Other objects, features, and advantages of the present invention will be apparent from the written description and the drawings in which.

DETAILED DESCRIPTION OF THE PREFERRED EMBODIMENT

Figure 1:
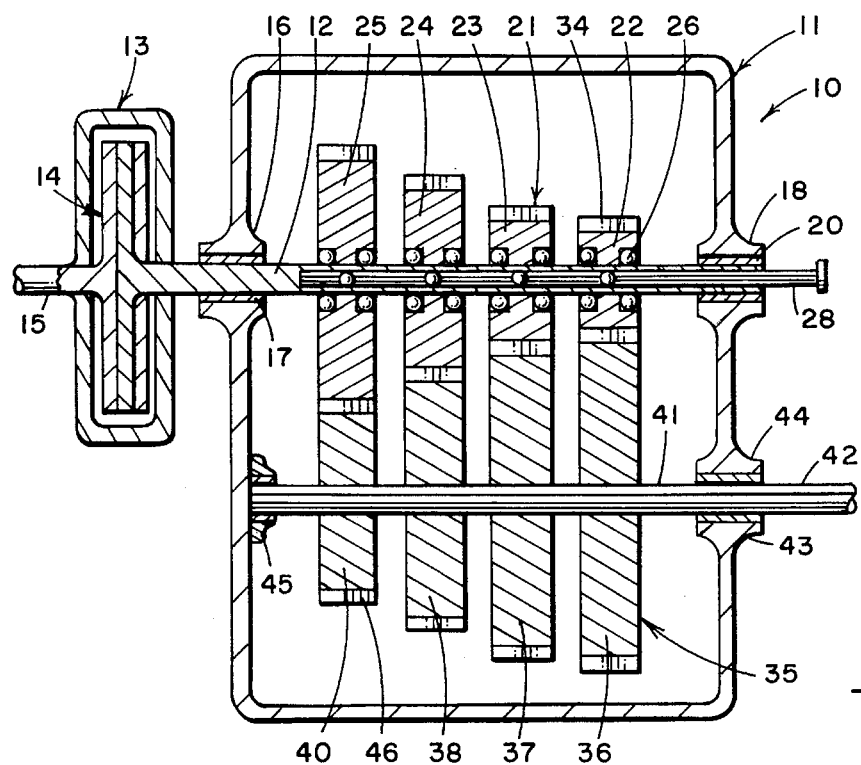
FIG. 1 is a sectional view taken through a transmission in accordance with the present invention.
Figure 2:
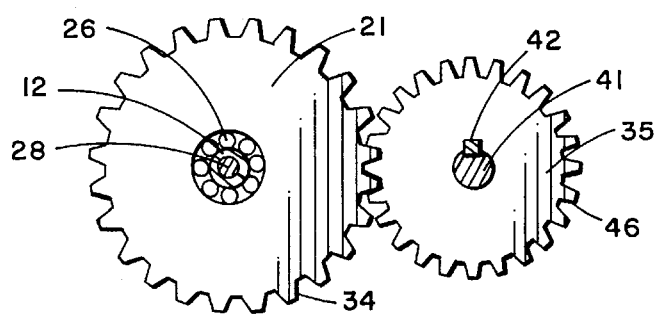
FIG. 2 is a sectional view taken through the input and output shafts of the transmission of FIG. 1.

Referring to the drawings, FIGS. 1–4, a multispeed power transmission 10 has a gear box or housing 11 having an input shaft 12 mounted therein and connected to a clutch 13 having a clutch mechanism 14 therein. The clutch 13 has an input shaft 15, which would typically be coupled to an engine of a vehicle or the like, for the clutch 13 to engage and disengage with the input shaft 12. The input shaft 12 is mounted between a journal 16 having a bearing 17 therein on one side of the transmission housing 11 and a journal 18 having a bearing 20 mounted therein on the opposite side of the housing 11. The input shaft 12 has a plurality of first gears 21 rotatably mounted thereon including different size gears 22, 23, 24, and 25. Each of the first gears 21 is supported on bearings 26 in order to freely rotate on the input shaft 12. The input shaft 12 has a bore 27 passing thereinto and has an elongated gear changing bar 28 sliding within the bore 27. The gear changing bar 28 may be splined to the housing to prevent it from rotating in the shaft 12.

Figure 3:
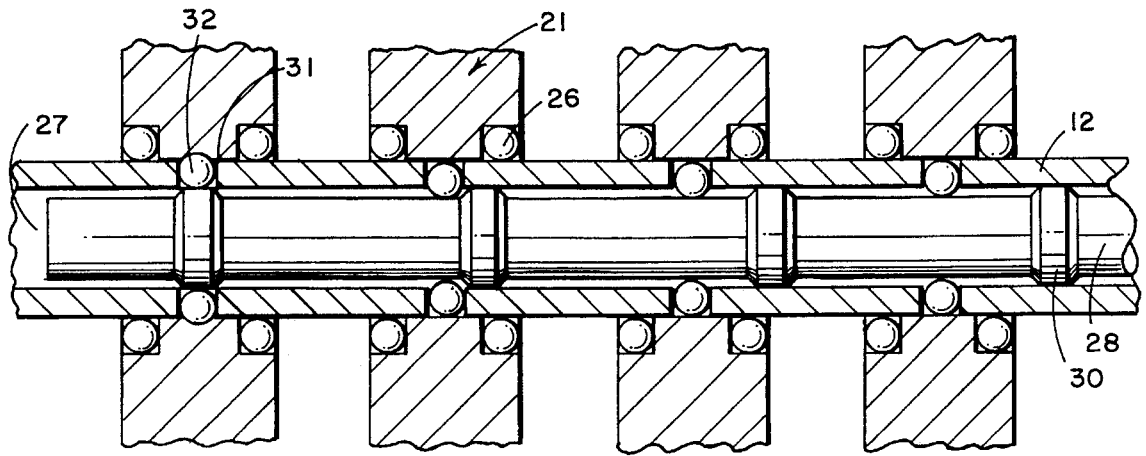
FIG. 3 is a sectional view taken through the input shaft transmission of FIG. 1.

The gear changing bar 28, as more clearly seen in FIG. 3, is slid axially along the bore 27 of the input shaft 12 and has a plurality of spaced annular ridges 30, each one adapted to be aligned with one or more input shaft side openings 31, and each having a gear engaging member 32, such as a spherical ball bearing or the like therein. Each input shaft side opening 31 has an angled or arcuate wedging surface 33 formed therein so that when the wedging member 32 is raised by virtue of the gear changing bar 28 aligning one of the ridges 30 with an opening 31 to drive the wedging member 32 up slightly to force it into a wedging contact with the associated gear 21 to thereby lock the gear 21 to the input shaft 12. Since each of the ridges 30 are spaced so that they will align only one at any one time with one of the gears 22, 23, 24, or 25, then only one gear can be locked to the input shaft 12 at any one time. Each gear 21 has its teeth 34 in constant mesh with second gears 35 including gears 36, 37, 38, and 40, each of which is fixedly attached to an output shaft 41. The output shaft 41 has a spline 42 for holding each of the gears 35 for rotation with the shaft 41. Shaft 41 is supported in a journal 43 having a shaft bearing 44 on one end and in a journal 45 at the other end having a second bearing therein. Each of the gears 35 has gear teeth 46 thereon constantly intermeshed with the gear teeth 34. A pair of resilient or rubber nodules 39 can be placed to stop the wedging member 32 in each direction and push the wedging member loose from a wedged position when changing gears.

In operation, any one of the gears 21 may be locked with the gear changing bar 28 by sliding the bar 28 axially in the bore 27 of the input shaft 12 to align one activating ridge 30 with openings 31. Only one gear 21 is locked to shaft 12 at one time and drives one of the gears 35 even though all of the gears 21 and 35 are constantly intermeshed and each pair can in turn drive the output shaft 41 by switching between engagement of the gears 21 by the sliding of the gear changing bar 28. The transmission can be shifted between gear ratios thus changing the speed and torque of the output shaft 41. The clutch 13 is activated to disengage the power on the shaft 15 to the input shaft 12 to allow the gear changing bar 28 to be slid axially for alignment of a different engaging ridge 30. All pairs of gears are constantly meshing with a simplified gear changing technique for selectively engaging each idle gear on the input shaft 12 to interconnect with the rotating shaft 12 for driving any one gear at a selected gear ratio. The resilient members 39 prevent a wedging member 32 from sticking in a wedged position.

Figure 4:
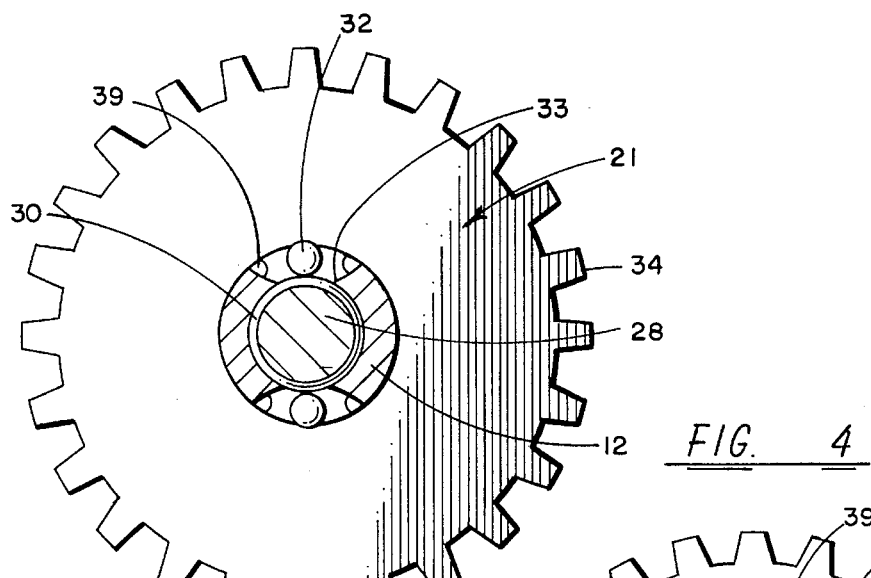
FIG. 4 is a sectional view taken through the input shaft of FIG. 3.
Figure 6:
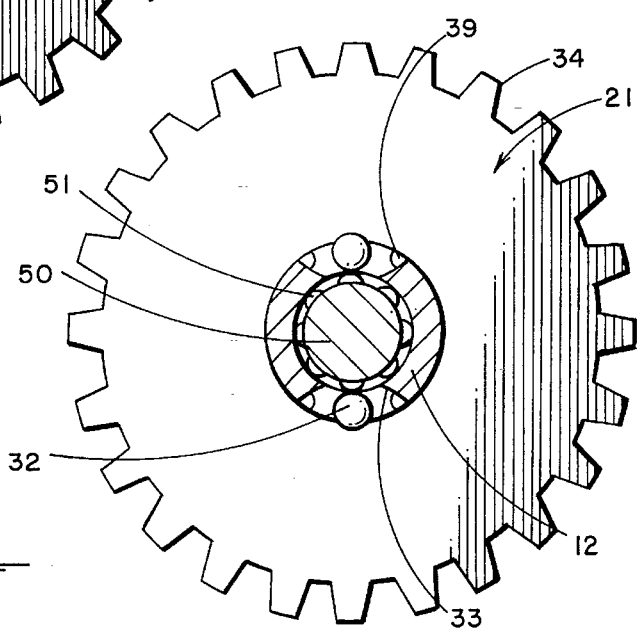
FIG. 6 is a sectional view taken through the input shaft of the embodiment of FIG. 5.
Figure 5:
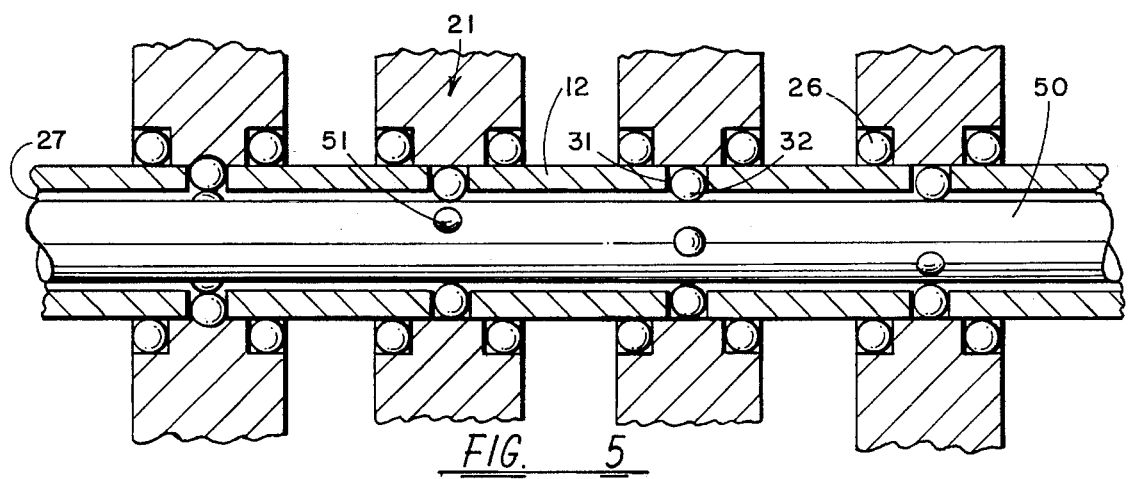
FIG. 5 is a sectional view taken through an input shaft of an alternate embodiment of an input shaft.

Turning to FIGS. 4, 5 and 6, a second embodiment of the gear changing mechanism is illustrated having a rotating gear changing bar 50 rotating in the input shaft 12 bore and having the plurality of openings 31 therein which also has the angled or arcuate surface 33 and the spherical wedging member 32 mounted therein. The bar 50 does not have the annular ridges 30 of FIGS. 1 and 4 but rather has a plurality of spaced camming surfaces 51 spaced therearound the gear changing bar 50, as well as being spaced apart from each other so that each camming member 51 is positioned for alignment with the holes 31 and wedging members 32 for only one of the gears 21. Rotation of the shaft 50, when the clutch 13 has been released, can align only one set of camming nodes for one gear 21 with the opening 31 at a time and can be shifted so that different camming surfaces 51 align with different gear 21 openings 31 for different rotary positions of the gear changing bar 50. Rotating the bar 50 will change the gear by changing the gear 21 which is locked to the input shaft 12 at any one time and thus change the pair of intermeshed gears 21 and 35 which are driving the output shaft 41. In addition, rotating the shaft 50 to a position where no camming surfaces 51 are aligned with any of the openings 31 leaves none of the gears 21 locked to the input shaft 12 and the transmission in idle. This would also be the case with the embodiment of FIGS. 3 and 4 in that sliding the gear changing bar 28 to a position where none of the ridges are aligned with the openings 31 would leave the transmission in idle with none of the constant meshed gears 21 and 35 being driven by the shaft 12.

It should be clear at this time that a multispeed power transmission has been provided for use in vehicles of all types and which has constantly meshing pairs of gears for different ratios for changing the torque and speed of the output shaft of the transmission and which is accomplished with a simplified gear changing system for locking different gears to the input shaft selectively one at a time. However, the present invention should not be construed as limited to the forms shown which are to be considered illustrative rather than restrictive.

I claim:

1. A multi-speed power transmission for coupling to an engine comprising:

a housing;

an input shaft rotatable mounted in said housing and extending therefrom;

an output shaft rotatable mounted in said housing and extending therefrom;

a clutch coupled to releasably engage said input shaft to thereby couple said input shaft to an engine;

a plurality of first gears freely rotatably on said input shaft;

a plurality of second gears mounted to said output shaft for rotation with said output shaft, each said second gear being coupled to one said first gear;

said input shaft having a bore extending thereinto from one end thereof and said input shaft having a plurality of side bore openings;

a plurality of first gear engaging members located between said input shaft and each said first gear for selectively engaging each first gear to said input shaft such that only one first gear is engaged to said input shaft at a time, each said input shaft side bore opening being an angled wedging opening having said first gear engaging members therein for wedging between said input shaft and one said first gear and each said angled wedging opening having a pair of resilient members attached thereto for freeing said first gear engaging members from a wedged position when changing gears; and an elongated gear changing bar movably mounted on the center axis of said input shaft bore, said elongated gear changing bar having engaging portions therein in each said input shaft opening for engaging one of said plurality of first gear engaging members to said input shaft when said elongated gear changing bar is positioned in a predetermined position to thereby couple said input shaft with one first gear and one second gear to said output shaft.

2. A multi-speed power transmission for coupling to an engine in accordance with claim 1 in which each said first gear engagement member is a spherical wedging member.

3. A multi-speed power transmission for coupling to an engine in accordance with claim 2 in which elongated gear changing bar has a plurality of raised portions formed thereon spaced for engagement of one set of wedging bearings at a time when slid along center axis of said input shaft bore.

4. A multi-speed power transmission for coupling to an engine in accordance with claim 3 in which elongated gear changing bar plurality of raised portions are annular raised portions formed thereon and spaced for alignment with one set of input shaft side openings at a time for engaging only one first gear to said input shaft at a time.

5. A multi-speed power transmission for coupling to an engine in accordance with claim 1 in which elongated gear changing bar is rotatably mounted in said input shaft bore.

6. A multi-speed power transmission for coupling to an engine in accordance with claim 5 in which elongated gear changing bar has a plurality of raised portions formed thereon spaced for engagement of one set of bearing at a time when rotated on the center axis of said input shaft bore.

7. A multi-speed power transmission for coupling to an engine in accordance with claim 6 in which elongated gear changing bar plurality of raised portions are raised portions formed thereon and spaced around said elongated gear changing bar for alignment with one set of input shaft side openings at a time for engaging only one first gear to said input shaft at a time.

* * * * *